United States Patent
Amagai et al.

(10) Patent No.: US 6,225,439 B1
(45) Date of Patent: May 1, 2001

(54) COMPOSITIONS FOR A RESIN

(75) Inventors: Akikazu Amagai; Masanori Shimuta; Katsuyuki Mizuno; Motoharu Takeuchi, all of Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/198,172

(22) Filed: Nov. 23, 1998

(30) Foreign Application Priority Data

Dec. 3, 1997 (JP) .................................................. 9-333120

(51) Int. Cl.$^7$ .................................................. C08G 75/00
(52) U.S. Cl. .......................... 528/380; 528/377; 528/405
(58) Field of Search ...................... 528/380, 377

(56) References Cited

U.S. PATENT DOCUMENTS

| 3,378,522 | * | 4/1968 | Martin | ...................................... 549/90 |
| 5,374,668 | | 12/1994 | Kanemura et al. | . |

FOREIGN PATENT DOCUMENTS

| 0761655 | * | 3/1997 | (EP) . |
| 0785194 | * | 7/1997 | (EP) . |
| 1-98615 | | 4/1989 | (JP) . |
| 3-81320 | | 4/1991 | (JP) . |
| 4-58489 | | 9/1992 | (JP) . |
| 5-148340 | | 6/1993 | (JP) . |
| WO 89/10575 | | 11/1989 | (WO) . |

* cited by examiner

*Primary Examiner*—Patricia A. Short
(74) *Attorney, Agent, or Firm*—Frishauf, Holtz, Goodman, Langer & Chick, P.C.

(57) ABSTRACT

A composition for a resin which comprises (a) a compound having one or more structures represented by the following formula in one molecule:

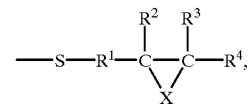

wherein $R^1$ represents a hydrocarbon group having 1 to 10 carbon atoms, $R^2$, $R^3$ and $R^4$ each represents a hydrogen atom or a hydrocarbon group having 1 to 10 carbon atoms, X represents S or O, and an average number of S represented by X is about 50% or more of a total number of S and O constituting the three-member ring, and (b) a compound having one or more active hydrogen atoms in one molecule and which is an alcohol having an acryloyloxy group or a methacryloyloxy group, or a mercaptoalcohol.

20 Claims, No Drawings

COMPOSITIONS FOR A RESIN

BACKGROUND OF THE INVENTION

1. Field of the Invention

The present invention relates to a composition which is advantageously used for optical materials, such as plastic lenses, prisms, substrates of information recording materials and filters, particularly as a material of plastic lenses of glasses.

2. Description of the Related Arts

Plastic materials have widely been used as various optical materials, particularly as lenses of glasses, because of light weight, toughness and easiness of tinting. The properties required for optical materials, particularly for lenses of glasses, are a low specific gravity, optical properties such as large refractive index and Abbe number and physical properties such as high heat resistance and strength. A large refractive index is important to decrease thickness of a lens. A large Abbe number is important to decrease the chromatic aberration of a lens. High heat resistance and strength are important to facilitate fabrication and also from the standpoint of safety.

As conventional materials having a large refractive index, thermosetting optical materials having a thiourethane structure which are obtained by the reaction of a polythiol compound and a polyisocyanate compound have been proposed (Japanese Patent Publication Heisei 4(1992)-58489 and Japanese Patent Application Laid-Open No. Heisei 5(1993)-148340). Technology to obtain a lens by polymerization of an epoxy resin or an episulfide resin with a multi-functional compound have also been proposed in the specifications of Japanese Patent Application Laid-Open No. Heisei 1(1989)-98615, Japanese Patent Application Laid-Open No. Heisei 3(1991)-81320 and International Patent Application Laid-Open No. wo8910575. Of course, optical materials having further large refractive indices are desirable.

A small chromatic aberration is another important property required for an optical material. The larger the Abbe number, the smaller the chromatic aberration. Therefore, a material having a large Abbe number is also desirable. Thus, a material having both large refractive index and large Abbe number is desired.

However, the Abbe number tends to decrease with an increase in the refractive index. Plastic materials obtained from conventional compounds have a maximum Abbe number of about 50 to 55 when the refractive index is 1.50 to 1.55, about 40 when the refractive index is 1.60 and about 31 when the refractive index is 1.66. When the refractive index is forced to increase to 1.70, the Abbe number decreases to 30 or less and the obtained material cannot practically be used.

Moreover, in the case of conventional materials, particularly materials having a thiourethane structure, the molecular weight of a sulfur-containing compound used as the raw material must be increased to achieve a large refractive index and this decreases the crosslinking density. The content of alkyl groups must be increased to achieve a large Abbe number and this decreases the rigidity of molecules of the raw material compounds. As the result, drawbacks such as a decrease in heat resistance arise. In other words, the refractive index of conventional optical materials obtained from episulfide compounds, polythiol compounds and isocyanate compounds can be increased only to a limited degree. Moreover, an increase in the refractive index decreases the Abbe number. Therefore, an advantageous balance between a large refractive index and a large Abbe number cannot be achieved by conventional optical materials.

To solve the above problems, the present inventors discovered a novel sulfur-containing compound having an episulfide structure from which an optical material having a small thickness and a decreased chromatic aberration could be obtained (Japanese Patent Application Nos. Heisei 8(1996)-214631 and Heisei 8(1996)-5797). However, the optical material obtained by curing this sulfur-containing compound by polymerization does not show a sufficient tint performance.

SUMMARY OF THE INVENTION

The present invention has an object to improve the tint performance of the resin obtained by curing by polymerization of the above novel sulfur-containing compound having the episulfide structure which has been discovered by the present inventors.

Accordingly, the present invention provides a composition for a resin which comprises:

(a) a compound having one or more structures represented by the following formula (1) in one molecule:

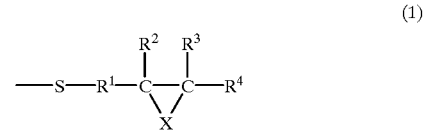

wherein $R^1$ represents a hydrocarbon group having 1 to 10 carbon atoms, $R^2$, $R^3$ and $R^4$ each represents a hydrogen atom or a hydrocarbon group having 1 to 10 carbon atoms, X represents S or O and an average number of S represented by X is about 50% or more of a total number of S and O constituting the three-membered ring, and (b) a compound having one or more active hydrogen atoms in one molecule, at least one of the active hydrogen atoms being an active hydrogen atom other than the hydrogen atom of the SH group, wherein a ratio by mol of a total of the active hydrogen atom other than the hydrogen atom of the SH group in compound (b) to a total of episulfide group and epoxy group in compound (a) is 0.001 to 0.5; and a resin obtained by curing this composition by polymerization.

The present invention also provides a composition for a resin described above, wherein compound (a) is a compound represented by the following formula (2):

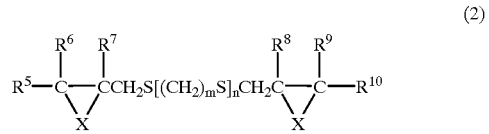

wherein $R^5$ to $R^{10}$ each represents a hydrogen atom or a hydrocarbon group wherein $R^5$ to $R^{10}$ each represents hydrogen atom or a hydrocarbon group having 1 to 10 carbon atoms, X represents S or O and an average number of S represented by X is about 50% or more of a total number of S and O constituting the three-member rings, m represents 1 to 6 and n represents 0 to 4.

DESCRIPTION OF THE PREFERRED EMBODIMENTS

In the present invention, the ratio by mol of the total of the active hydrogen atom other than the hydrogen atom of the SH group in compound (b) to the total of the episulfide group and/or the epoxy group is 0.001 to 0.5, preferably 0.001 to 0.3, more preferably 0.001 to 0.2 and most preferably 0.01 or more and less than 0.1. When the ratio exceeds 0.5, the heat resistance of the material obtained by curing the composition for a resin by polymerization decreases and the obtained material cannot be used as an optical material. When the ratio is less than 0.001, the excellent tint performance which is the object of the present invention is not obtained.

To obtain the large refractive index which is also the object of the present invention, it is preferable that $R^1$ in formula (1) represents a methylene group or an ethylene group and $R^2$, $R^3$ and $R^4$ in formula (1) and $R^5$, $R^6$ and $R^7$ in formula (2) each preferably represents a hydrogen atom or a methyl group. It is more preferable that $R^1$ represents a methylene group and $R^2$, $R^3$, $R^4$, $R^5$, $R^6$ and $R^7$ each represents a hydrogen atom. The average number of S in each of formula (1) and formula (2) is 50% or more, preferably 90% or more, more preferably 95% or more and most preferably substantially 100% of the total number of S and O constituting the three-membered rings.

Examples of compound (a) which is the compound having one or more structures represented by formula (1) in one molecule are as follows.

I. Examples of the compound having one structure represented by formula (1) in one molecule include bis(β-epothiopropyl)sulfide and compounds obtained by substituting at least one hydrogen atom of the episulfide group in bis(β-epothiopropyl)sulfide with a methyl group.

II. Examples of the compound having two or more structures represented by formula (1) in one molecule include:
(A) Organic compounds having a chain aliphatic backbone structure to which two or more structures represented by formula (1) are bonded.
(B) Organic compounds having a cyclic aliphatic backbone structure to which two or more structures represented by formula (1) are bonded.
(C) Organic compounds having a aromatic backbone structure to which two or more structures represented by formula (1) are bonded.

The above compounds may also contain other structures such as sulfides, ethers, sulfones, ketones and esters in the molecule.

Compounds (A) which are organic compounds having a chain aliphatic backbone structure are classified into compounds having a linear structure and compounds having a branched structure. Any of these compounds can be used. Preferable examples of these compounds include linear organic compounds such as bis(β-epithiopropylthio)methane, 1,2-bis(β-epithiopropylthio)ethane, 1,3-bis(β-epithiopropylthio)propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β-epithiopropylthio)butane, 1-(β-epithiopropylthio)-3-(β-epithiopropylthiomethyl)-butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane and 1-(β-epithiopropylthio)-2-[[2-(2-β-epithiopropylthioethyl)thioethyl]thio]ethane; branched organic compounds such as tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)- 4-(β-epithiopropylthiomethyl)-3-thiahexane, 1,8-bis(β-epithiopropylthio)-4-(β-epithiopropylthiomethyl)-3,6-dithiaoctane, 1,8-bis(p-epthiopropylthio)-4,5-bis(β-epithiopropylthiomethyl)-3,6-dithiaoctane, 1,8-bis(β-epthiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl) thiomethyl]-3,7-dithianonane, 1,10-bis(β-epithiopropylthio)-5,6-bis [(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane and 1,11-bis(β-epithiopropylthio)-4,7-bis(β-epithiopropylthiomethyl)-3,6,9-trithiaundecane; and compounds obtained by substituting at least one hydrogen atom of the episulfide group in the above compounds with methyl group.

Preferable examples of compound (B) which is the organic compound having a cyclic aliphatic backbone structure include cyclic aliphatic organic compounds such as 1,3- and 1,4-bis(β-epithiopropylthio)cyclohexanes, 1,3-and 1,4-bis(β-epithiopropylthiomethyl)cyclohexanes, bis[4-(β-epithiopropylthio)cyclohexyl]methane, 2,2-bis [4-(β-epithiopropylthio)cyclohexyl]propane, bis[4-(β-epithiopropylthio)cyclohexyl]sulfide, 2,5-bis(β-epithiopropylthiomethyl)-1,4-dithiane and 2,5-bis(β-epithiopropylthioethylthiomethyl)-1,4-dithiane; and compounds obtained by substituting at least one hydrogen atom of the episulfide group in the above compounds with methyl group. Preferable examples of compound (C) which is the organic compound having an aromatic backbone structure include aromatic organic compounds such as 1,3- and 1,4-bis(β-epithiopropylthio)benzenes, 1,3- and 1,4-bis(β-epithiopropylthiomethyl)benzenes, bis[4-(β-epithiopropylthio)-phenyl]methane, 2,2-bis [4-(β-epithiopropylthio)phenyl]propane, bis [4-(β-epithiopropylthio)phenyl]sulfide, bis[4-(β-epithiopropylthio)phenyl]sulfone and 4,4'-bis(β-epithiopropylthio)biphenyl; and compounds obtained by substituting at least one hydrogen atom of the episulfide group in the above compounds with methyl group. However, compound (a) is not limited to the above compounds shown as examples. The above compounds may be used singly or as a mixture of two or more compounds.

A most preferable example of compound (a) is bis(β-epithiopropyl) sulfide.

The active hydrogen atom in compound (b) in the present invention means a reactive hydrogen atom other than the hydrogen atom of a SH group such as hydrogen atoms in a hydroxyl group, a carboxyl group and an amide group and hydrogen atoms at the 2-position of 1,3-diketones, 1,3-dicarboxylic acids, esters of 1,3-dicarboxylic acids, 3-ketocarboxylic acids, and esters of 3-ketocarboxylic acids. Examples of compound (b) which is the compound having at least one active hydrogen atom in one molecule include alcohols, phenols, mercaptoalcohols, hydroxythiophenols, carboxylic acids, mercaptocarboxylic acids, hydroxycarboxylic acids, amides, 1,3-diketones, 1,3-dicarboxylic acids, esters of 1,3-dicarboxylic acids, 3-ketocarboxylic acids, esters of 3-ketocarboxylic acids, and compounds having unsaturated groups such as alcohols, phenols, mercaptoalcohols, hydroxythiophenols, carboxylic acids, mercaptocarboxylic acids, hydroxycarboxylic acids, amides, 1,3-diketones, 1,3-dicarboxylic acids, esters of 1,3-dicarboxylic acids, 3-ketocarboxylic acids and esters of 3-ketocarboxylic acids having a vinyl group, aromatic vinyl groups, a methacrylic group, an acrylic group and an allyl group.

Examples of the alcohol include monohydric alcohols such as methanol, ethanol, n-propyl alcohol, isopropyl alcohol, n-butyl alcohol, isobutyl alcohol, sec-butyl alcohol, tert-butyl alcohol, n-pentyl alcohol, isopentyl alcohol, n-hexyl alcohol, n-heptyl alcohol, n-octyl alcohol, n-nonyl alcohol, n-decyl alcohol, n-dodecyl alcohol, cyclopentanol, cyclohexanol, 2-methylthioethanol, 2-ethylthioethanol, 2-(n-dodecylthio)ethanol and n-dodecyl hydroxyethyl sulfoxide; and polyhydric alcohols such as ethylene glycol, propylene glycol, 1,3-propanediol, diethylene glycol, triethylene glycol, polyethylene glycol, 1,3-butylene glycol, 1,6-hexanediol, neopentyl glycol, polypropylene glycol, glycerol, pentaerythritol monomethacrylate, pentaerythritol monoacrylate, pentaerythritol dimethacrylate, pentaerythritol diacrylate, 2,5-dimethyl-3-hexyne-2,5-diol, 2,5-dimethylhexane-2,5-diol, trimethylolpropane, pentaerythritol, hydrogenated bisphenol A, 2-hydroxyethyl isocyanurate and 2-hydroxyethyl cyanurate.

Examples of the phenol include phenol, o-cresol, m-cresol, p-cresol, catechol, resorcinol, hydroquinone, o-hydroxybenzaldehyde, m-hydroxy-benzaldehyde, p-hydroxybenzaldehyde, bisphenol A, bisphenol F and bisphenol Z.

Examples of the mercaptoalcohol include 2-mercaptoethanol, 3-mercaptopropanol, 2-mercaptopropanol, 2-hydroxypropylmercaptan, 2-phenyl-2-mercaptoethanol, 2-phenyl-2-hydroxyethylmercaptan, 3-mercapto-1,2-propanediol, 2-mercapto-1,3-propanediol, 2,3-dimercapto-propanol, 1,3-dimercapto-2-propanol, 2,2-dimethylpropane-1,3-dithiol and glyceryl dithioglycolate.

Examples of the hydroxythiophenol include 2-hydroxythiophenol, 3-hydroxythiophenol and 4-hydroxythiophenol.

Examples of the carboxylic acid include formic acid, acetic acid, propionic acid, butyric acid, valeric acid, caproic acid, caprylic acid, methyl mercaptopropionate, oxalic acid, malonic acid, succinic acid, glutaric acid, adipic acid, cyclohexanecarboxylic acid, benzoic acid, o-toluic acid, m-toluic acid, p-toluic acid, 2-methoxybenzoic acid, 3-methoxybenzoic acid, phthalic acid, isophthalic acid, terephthalic acid, thiodipropionic acid and dithiodipropionic acid.

Examples of the mercaptocarboxylic acid include thioglycolic acid, 2-thiopropionic acid, 3-thiopropionic acid, thiolactic acid, mercaptosuccinic acid, thiomalic acid, N-(2-mercaptopropionyl)glycine, 2-mercaptobenzoic acid, 2-mercaptonicotinic acid, 3,3-dithioisobutyric acid, dithioglycolic acid, and dithiopropionic acid.

Examples of the hydroxycarboxylic acid include hydroxyacetic acid, α-hydroxypropionic acid, β-hydroxypropionic acid, α-hydroxybutyric acid, β-hydroxybutyric acid, γ-hydroxybutyric acid, salicylic acid, 3-hydroxybenzoic acid and 4-hydroxybenzoic acid.

Examples of the amide include formamide, N-methylformamide, acetamide, N-methylacetamide, phthalamide, isophthalamide, terephthalamide, benzamide, toluamide, 4-hydroxybenzamide and 3-hydroxybenzamide.

Examples of the 1,3-diketone include acetylacetone and cyclohexane-1,3,5-trione.

Examples of the 1,3-dicarboxylic acid and the ester thereof include malonic acid, 2-methylmalonic acid and mono- and diesters thereof.

Examples of the 3-ketocarboxylic acid and the ester thereof include acetoacetic acid and esters thereof.

Specific examples of the alcohol, phenol, mercaptan, thiophenol, mercaptoalcohol, carboxylic acid and amide having unsaturated groups are as follows.

Examples of the alcohol having an unsaturated group include monohydroxy compounds such as 2-hydroxyethyl methacrylate, 2-hydroxyethyl acrylate, 3-hydroxypropyl methacrylate, 3-hydroxypropyl acrylate, 2-hydroxypropyl methacrylate, 2-hydroxypropyl acrylate, 1,3-dimethacryloxy-2-propanol, 1,3-diacryloxy-2-propanol, 1-acryloxy-3-methacryloxy-2-propanol, penta-erythritol trimethacrylate, pentaerythritol triacrylate, bis(2,2,2-trimethylolethyl)ether pentamethacrylate, bis(2,2,2-trimethylolethyl)ether pentaacrylate, trimethylolpropane dimethacrylate, trimethylol-propane diacrylate, allyl alcohol, crotyl alcohol, methyl vinyl carbinol, cinnamyl alcohol, 4-vinylbenzyl alcohol, 3-vinylbenzyl alcohol, 2-(4-vinylbenzylthio)ethanol, 2-(3-vinylbenzylthio)ethanol, 1,3-bis(4-vinyl-benzylthio)-2-propanol, 1,3-bis(3-vinylbenzylthio)-2-propanol, 2,3-bis(4-vinylbenzylthio)-1-propanol, 2,3-bis(3-vinylbenzylthio)-1-propanol, 3-phenoxy-2-hydroxylpropyl acrylate, 2-hydroxyethyl isocyanurate bis(acrylate), 2-hydroxyethyl isocyanurate bis(methacrylate), 2-hydroxyethyl cyanurate bis(acrylate), 2-hydroxyethyl cyanurate bis(methacrylate), 3-methyl-1-butyn-3-ol, 3-methyl-1-pentyn-3-ol and propargyl alcohol; polyhydroxy compounds such as pentaerythritol dimethacrylate, pentaerythritol diacrylate, pentaerythritol mono-methacrylate, pentaerythritol monoacrylate, trimethylolpropane monomethacrylate, trimethylolpropane monoacrylate, 2-hydroxyethyl isocyanurate mono(acrylate), 2-hydroxyethyl isocyanurate mono-(methacrylate), 2-hydroxyethyl cyanurate mono(acrylate) and 2-hydroxyethyl cyanurate mono(methacrylate); and unsaturated polyhydroxy compounds formed by the addition reaction of acrylic acid or methacrylic acid with epoxy compounds which are described later such as 2,2-bis[4-(2-hydroxy-3-methacryloxypropoxy)phenyl]propane.

Examples of the phenol having an unsaturated group include 2-vinylphenol, 3-vinylphenol and 4-vinylphenol.

Examples of the mercaptoalcohol having an unsaturated group include 2-(4-vinylbenzylthio)-2-mercaptoethanol and 2-(3-vinylbenzylthio)-2-mercaptoethanol.

Examples of the carboxylic acid having an unsaturated group include acrylic acid, methacrylic acid, crotonic acid, monohydroxyethyl acrylate phthalate, maleic acid, fumaric acid, monoallyl phthalate and cinnamic acid.

Examples of the amide having an unsaturated group include amides of α,β-unsaturated carboxylic acids such as acrylic acid, methacrylic acid, maleic acid, maleic anhydride and fumaric acid; and N-vinylformamide.

From the standpoint of heat resistance, preferable examples of the above compounds include mercaptoalcohols, hydroxythiophenols and alcohols having unsaturated groups.

Compound (b) described above may be used singly or as a mixture of two or more compounds.

The composition for a resin of the present invention can provide a resin by being cured by polymerization under heating in the presence or in the absence of a curing catalyst. It is preferable that a curing catalyst is used. As the curing catalyst, amines, phosphines, mineral acids, Lewis acids, organic acids, silicic acids and tetrafluoroboric acid are used.

(1) Examples of the amine used as the curing catalyst include primary monoamines such as ethylamine, n-propylamine, sec-propylamine, n-butylamine, sec-butylamine, isobutylamine, tert-butylamine, pentylamine, hexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenetylamine, α-phenylethylamine, naphthylamine and furfurylamine; primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl)ether, 1,2-bis-(3-aminopropoxy)ethane, 1,3-bis-(3-aminopropoxy)-2,2'-dimethylpropane, aminoethylethanolamine, 1,2-, 1,3- and 1,4-bisaminocyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, 2- and 4-aminopiperidines, 2- and 4-amino-methylpiperidines, 2- and 4-aminoethylpiperidines, N-aminoethyl-piperidine, N-aminopropylpiperidine, N-aminoethylmorpholine, N-amino-propylmorpholine, isophoronediamine, menthanediamine, 1,4-bisamino-propylpiperadine, o-, m- and p-phenylenediamines, 2,4- and 2,6-tolylenediamines, 2,4-toluenediamine, m-aminobenzylamine, 4-chloro-o-phenylenediamine, tetrachloro-p-xylylenediamine, 4-methoxy-6-methyl-m-phenylenediamine, m- and p-xylylenediamines, 1,5- and 2,6-naphthalene-diamines, benzidine, 4,4'-bis(o-toluidine), dianisidine, 4,4'-diamino-diphenylmethane, 2,2-(4,4'-diamiphenyl)propane, 4,4'-diaminodiphenyl ether, 4,4'-thiodianiline, 4,4'-diaminodiphenyl sulfone, 4,4'-diaminoditolyl sulfone, methylenebis(o-chloroaniline), 3,9-bis(3-aminopropyl)-2,4,8,10-tetraoxaspiro[5,5]undecane, diethylenetriamine, iminobispropylamine, methyliminobispropylamine, bis(hexamethylene)triamine, triethylene-tetramine, tetraethylenepentamine, pentaethylenehexamine, N-aminoethylpiperadine, N-aminopropylpiperadine, 1,4-bis(aminoethyl-piperadine), 1,4-bis(aminopropylpiperadine), 2,6-diaminopyridine and bis(3,4-diaminophenyl)sulfone; secondary monoamines such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, pyrrolidine, piperidine, 2-, 3- and 4-picolines, 2,4-, 2,6- and 3,5-lupetidines, diphenylamine, N-methylaniline, N-ethylaniline, dibenzylamine, methylbenzylamine, dinaphthylamine, pyrrol, indoline, indole and morpholine; secondary polyamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- and 2,6-dimethyl-piperadines, homopiperadine, 1,1-di-(4-piperidyl)methane, 1,2-di-(4-piperidyl)ethane, 1,3-di-(4-piperidyl)propane, 1,4-di(4-piperidyl)butane and tetramethylguanidine; tertiary amines such as trimethylamine, triethylamine, tri-n-propylamine, triisopropylamine, tri-1,2-dimethyl-propylamine, tri-3-methoxypropylamine, tri-n-butylamine, triisobutylamine, tri-sec-butylamine, tri-n-pentylamine, tri-3-pentylamine, tri-n-hexylamine, tri-n-octylamine, tri-2-ethylhexylamine, tridodecylamine, trilaurylamine, dicyclohexylethylamine, cyclohexyldiethylamine, tricyclohexylamine, N,N-dimethylhexylamine, N-methyldihexylamine, N,N-dimethylcyclohexylamine, N-methyldicyclohexylamine, N,N-diethyl-ethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine and 2-(2-dimethylaminoethoxy)-4-methyl-1,3,2-dioxabornane; tertiary polyamines such as tetramethyl-ethylenediamine, pyrazine, N,N'-dimethylpyrazine, N,N'-bis((2-hydroxy)-propyl)piperadine, hexamethylenetetramine, N,N,N',N'-tetramethyl-1,3-butaneamine, 2-dimethylamino-2-hydroxypropane, diethyaminoethanol, N,N,N-tris(3-dimethylaminopropyl)amine, 2,4,6-tris(N,N,N-dimethyl-aminomethyl)phenol and heptamethylisobiguanide; imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cycanoethyl)-2-undecylimidazole, N-(2'-cyanoethyl)-2-phenylimidazole, 3,3-bis-(2-ethyl-4-methylimidazolyl) methane, addition products of alkyl-imidazoles and isocyanuric acid and condensation products of alkylimidazoles and formaldehyde; and amidines such as 1,8-diazabicyclo-(5,4,0)undecene-7,1,5-diazabicyclo(4,3,O)nonene-5,6-dibutylamino-1,8-diazabicyclo(5,4,0)undecene-7.

(2) The above amines may be used as quaternary ammonium salts with halogens, mineral acids, Lewis acids, organic acids, silicic acid and tetrafluoroboric acid.

(3) The above amines may also be used as complexes with borane and trifluoroboron.

(4) Examples of the phosphine include trimethylphosphine, triethylphosphine, triisopropylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris-(diethylamino)phosphine, tris(4-methylphenyl) phosphine, dimethylphenyl-phosphine, diethylphenylphosphine, dicyclohexyolphenylphosphine, ethyldiphenylphosphine, diphenylcyclohexylphosphine and chlorodiphenylphosphine.

(5) Examples of the mineral acid include hydrochloric acid, sulfuric acid, nitric acid, phosphoric acid and carbonic acid. Half-esters of these mineral acids can also be used.

(6) Examples of the Lewis acid include boron trifluoride and boron trifluoride etherates.

(7) Organic acids and half-esters of organic acids can be used.

(8) Silicic acids and tetrafluoroboric acid can be used.

Among these compounds, primary monoamines, secondary monoamines, tertiary monoamines, tertiary polyamines, imidazoles, amidines, quaternary ammonium salts and phosphines are preferable because these compounds cause little coloring of the cured products. Secondary monoamines, tertiary monoamines, tertiary polyamines, imidazoles, amidines, quaternary ammonium salts and phosphines having one or less group which can react with the episulfide group are more preferable. These compounds may be used singly or as a mixture of two or more compounds.

The above curing catalyst is used in an amount generally in the range of 0.0001 to 1.0 mol, preferably in the range of 0.0001 to 0.5 mol, more preferably in the range of 0.0001 to 0.1 mol and most preferably in the range of 0.0001 to 0.05 mol per 1 mol of the compound having one or more structures represented by formula (1) in the molecule. When the amount of the curing catalyst exceeds 1.0 mol, the refractivity index and heat resistance of the cured product decrease and the cured product is colored. When the amount is less than 0.0001 mol, the curing does not proceed sufficiently and heat resistance becomes insufficient.

The composition for a resin of the present invention can provide a resin by being cured by polymerization with a compound having two or more functional groups which are reactive with the episulfide group and/or the epoxy group in compound (a), a compound having one or more functional groups which are reactive with the episulfide group and/or the epoxy group in compound (a) and one or more other homopolymerizable functional groups, a compound having one or more homopolymerizable functional group or a compound having one homopolymerizable functional group which is reactive with the episulfide group and/or the epoxy group.

Examples of the compound having two or more functional groups which are reactive with the episulfide group and/or the epoxy group in compound (a) include epoxy compounds, conventional episulfide compounds and polybasic carboxylic acid anhydrides.

Examples of the compound having one or more functional groups which are reactive with the episulfide group and/or the epoxy group in compound (a) and one or more other homopolymerizable functional groups include epoxy compounds, episulfide compounds and carboxylic acid anhydrides having unsaturated groups such as methacryl group, acryl group, allyl group, vinyl group and aromatic vinyl groups.

Examples of the compound having one or more homopolymerizable functional group include compounds having unsaturated groups such as methacryl group, acryl group, allyl group, vinyl group and aromatic vinyl groups.

Specific examples of the compound having two or more functional groups which are reactive with the episulfide group and/or the epoxy group are as follows.

Specific examples of the epoxy compound include epoxy compounds derived from phenols which are produced by condensation of epihalohydrins with polyhydric phenols such as hydroquinone, catechol, resorcinol, bisphenol A, bisphenol F, bisphenol sulfone, bisphenol ether, bisphenol sulfide, halogenated bisphenol A and novolak resins; epoxy compounds derived from alcohols which are produced by condensation of epihalohydrins with polyhydric alcohols such as ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane trimethacrylate, pentaerythritol, 1,3- and 1,4-cyclohexanediols, 1,3- and 1,4-cyclohexanedimethanols, hydrogenated bisphenol A, adducts of ethylene oxide and bisphenol A and adducts of propylene oxide and bisphenol A; epoxy compounds of glycidyl esters which are produced by condensation of epihalohydrins with polybasic carboxylic acid compounds such as adipic acid, sebacic acid, dodecandicarboxylic acid, dimer acid, phthalic acid, isophthalic acid, terephthalic acid, tetrahydrophthalic acid, methyltetrahydrophthalic acid, hexahydrophthalic acid, hexahydroisophthalic acid, hexahydroterephthalic acid, HET acid, nadic acid, maleic acid, succinic acid, fumaric acid, trimellitic acid, benzenetetracarboxylic acid, benzophenonetetracarboxylic acid, naphthalenedicarboxylic acid and diphenyldicarboxylic acid; epoxy compounds derived from amines which are produced by condensation of epihalohydrins with primary amines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl)ether, 1,2-bis(3-aminopropoxy)ethane, 1,3-bis(3-aminopropoxy)-2,2'-dimethylpropane, 1,2-, 1,3- and 1,4-bisamino-cyclohexanes, 1,3- and 1,4-bisaminomethylcyclohexanes, 1,3- and 1,4-bisaminoethylcyclohexanes, 1,3- and 1,4-bisaminopropylcyclohexanes, hydrogenated 4,4'-diaminodiphenylmethane, isophoronediamine, 1,4-bisaminopropylpiperadine, m- and p-phenylenediamines, 2,4- and 2,6-tolylenediamines, m- and p-xylylenediamines, 1,5- and 2,6-naphthalene-diamines, 4,4'-diaminodiphenylmethane, 4,4'-diaminodiphenyl ether, 2,2-(4,4'-diaminodiphenyl)propane, and secondary amines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methyl-piperadine, 2,5- and 2,6-dimethylpiperadines, homopiperadine, 1,1-di(4-piperadyl)methane, 1,2-di(4-piperidyl)ethane, 1,3-di(4-piperidyl)propane and 1,4-di(4-piperidyl)butane; alicyclic epoxy compounds such as 3,4-epoxy-cyclohexyl 3,4-epoxycyclohexanecarboxylate, vinylcyclohexane dioxide, 2-(3,4-epoxycyclohexyl)-5,5-spiro-3,4-epoxycyclohexane-meta-dioxane and bis(3,4-epoxycyclohexyl)adipate; epoxy compounds produced by epoxidation of unsaturated compounds such as cyclopentadiene epoxide, epoxidized soy bean oil, epoxidized polybutadiene and vinylcyclohexene epoxide; and epoxy compounds of urethane produced from the above polyhydric alcohols and phenols, diisocyanates and glycidol.

Examples of the episulfide compound include episulfide compounds obtained by converting a portion of the epoxy group or the entire epoxy group in the above epoxy compounds into the episulfide group.

Examples of the polybasic carboxylic acid anhydride include anhydrides of the acids described above which produce the epoxy compounds by the condensation with epihalohydrins.

Specific examples of the compound having one functional group which are reactive with the episulfide group and/or the epoxy group in compound (a) and one or more other homopolymerizable functional groups are as follows.

Examples of the epoxy compound having unsaturated groups include vinylphenyl glycidyl ether, vinylbenzyl glycidyl ether, glycidyl methacrylate, glycidyl acrylate and allyl glycidyl ether. Examples of the episulfide compound having unsaturated groups include compounds obtained by replacing the epoxy group in the above epoxy compound having unsaturated group with the episulfide group, such as vinylphenyl thioglycidyl ether, vinylbenzyl thioglycidyl ether, thioglycidyl methacrylate, thioglycidyl acrylate and ally thioglycidyl ether.

Examples of the compound having one or more homopolymerizable functional groups include compounds having a structure of an ester of acrylic acid or methacrylic acid and a mono- or polyhydric alcohol such as methyl acrylate, methyl methacrylate, ethyl acrylate, ethyl methacrylate, ethylene glycol diacrylate, ethylene glycol dimethacrylate, diethylene glycol diacrylate, diethylene glycol dimethacrylate, triethylene glycol diacrylate, triethylene glycol dimethacrylate, polyethylene glycol diacrylate, polyethylene glycol dimethacrylate, 1,3-butylene glycol diacrylate, 1,3-butylene glycol dimethacrylate, 1,6-hexanediol diacrylate, 1,6-hexanediol dimethacrylate, neopentyl glycol diacrylate, neopentyl glycol dimethacrylate, polypropylene glycol diacrylate, polypropylene glycol dimethacrylate, 2,2-bis [4-(acryloxyethoxy)phenyl]propane, 2,2-bis [4-(methacryloxyethoxy)phenyl]propane, 2,2-bis [4-(acryloxy•diethoxy)-phenyl]propane, 2,2-bis[4-(methacryloxy-diethoxy)phenyl]propane, 2,2-bis [4-(acryloxy•polyethoxy)phenyl]propane, 2,2-bis [4-(methacryloxy-polyethoxy)phenyl]propane, trimethylolpropane triacrylate, trimethylol-propane trimethacrylate, pentarythritol tetraacrylate, pentaerythritol tetramethacrylate, bis(2,2,2-trimethylolethyl)ether hexaacrylate and bis(2,2,2-trimethylolethyl)ether hexamethacrylate; allyl compounds such as allyl sulfide, diallyl phthalate and diethylene glycol bisallylcarbonate; vinyl compounds such as acrolein, acrylonitrile and vinyl sulfide; and aromatic vinyl compounds such as styrene, α-methylstyrene, methylvinyl-benzene, ethylvinylbenzene, α-chlorostyrene, chlorovinylbenzene, vinylbenzyl chloride, para-divinylbenzene and meta-divinylbenzene.

Preferable examples of the compound having one homopolymerizable functional group which is reactive with the episulfide group and/or the epoxy group include compounds having one epoxy group or episulfide group. Specific examples of such compound include monoepoxy compounds such as ethylene oxide, propylene oxide and glycidol; glycidyl esters of monocarboxylic acids such as acetic acid, propionic acid and benzoic acid; glycidyl ethers such as methyl glycidyl ether, ethyl glycidyl ether, propyl glycidyl ether and butyl glycidyl ether; monoepisulfides such as ethylene sulfide and propylene sulfide; thioglycidyl esters having a structure derived from the above monocarboxylic acids and thioglycidol (1,2-epithio-3-hydroxypropane); and thioglycidyl ethers such as methyl thioglycidyl ether (1,2-epithiopropyloxymethane), ethyl thioglycidyl ether, propyl thioglycidyl ether and butyl thioglycidyl ether. Among these compounds, compounds having one episulfide group are preferable.

The compound having two or more functional groups which are reactive with the episulfide group and/or the epoxy group in compound (a) in the composition of the present invention and the compound having one functional group described above and one or more other homopolymerizable functional groups can be produced by being cured by polymerization in the presence of a curing catalyst. As the curing catalyst, the amines, the phosphines and the acids described above can be used. Examples of the curing catalyst are the same as those described above.

When the compound having unsaturated groups is used, it is preferable that a radical polymerization initiator is used as the polymerization accelerator. Any compound forming a radical by heating or by irradiation of ultraviolet light or electron beams can be used as the radical polymerization initiator. Examples of the radical polymerization initiator include the following conventional polymerization catalysts used under heating: peroxides such as cumyl peroxyneodecanoate, diisopropyl peroxydicarbonate, diallyl peroxydicarbonate, di-n-propyl peroxydicarbonate, dimyristyl peroxydicarbonate, cumyl peroxyneohexanoate, tert-hexyl peroxyneodecanoate, tert-butyl peroxyneodecanoate, tert-hexyl peroxyneohexanoate, tert-butyl peroxyneohexanoate, 2,4-dichlorobenzoyl peroxide, benzoyl peroxide, dicumyl peroxide and di-tert-butyl peroxide, hydroperoxides such as cumene hydroperoxide and tert-butyl hydroperoxide, and azo compounds such as 2,2'-azobis(4-methoxy-2,4-dimethylvaleronitrile), 2,2'-azobis(2-cyclopropylpropionitrile), 2,2'-azobis-( 2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2-methylpropane) and 2,2'-azobis(2,4,4-trimethylpentane); and conventional photopolymerization catalysts such as benzophenone and benzoin benzoinmethyl ether. Among these compounds, peroxides, hydroperoxides and azo compounds are preferable and peroxides and azo compounds are more preferable. Most preferable examples include azo compounds such as 2,2'-azobis(4-methoxy-2,4-dimethylvaleronitrile), 2,2'-azobis(2-cyclopropylpropionitrile), 2,2'-azobis-(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2-methylpropane) and 2,2'-azobis(2,4,4-trimethylpentane. The above compounds may be used as a mixture of the compounds.

The amount of the radical polymerization initiator is different depending on the components of the composition and the process for curing and cannot be decided. The amount is generally in the range of 0.01 to 5.0% by weight and preferably in the range of 0.1 to 2.0% by weight of the total amount of the composition.

When optical materials are obtained by curing the composition of the present invention by polymerization, it is, of course, possible that conventional additives such as antioxidants and ultraviolet light absorbants are added to improve the practical properties of the obtained materials. The composition of the present invention tends to be cleaved from molds during polymerization. Therefore, it is occasionally necessary that conventional external and/or internal adhesion improvers are used or added to control and improve adhesion between the cured material obtained and the mold. Examples of the internal adhesion improver include silane compounds such as 3-methacryloxypropyltrimethoxysilane, 3-glycidoxypropyltrimethoxysilane, N-(2-aminoethyl)-3-aminopropyl-trimethoxysilane and 3-mercaptopropyltrimethoxysilane. The internal adhesion improver can be used in an amount of 0.0001 to 5 parts by weight per 100 parts by weight of the composition of the present invention.

It is also possible that compounds having one or more SH groups is added as an antioxidant component singly or in combination with conventional antioxidants to provide the cured composition of the present invention with a further antioxidation property. Examples of the compound having one or more SH groups include mercaptans, thiophenols and mercaptans and thiophenols having unsaturated groups such as vinyl group, aromatic vinyl groups, methacryl group, acryl group and ally group.

Specific examples of the mercaptan include monomer-captans such as methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, isopropyl mercaptan, tert-butyl mercaptan, tert-nonyl mercaptan, tert-dodecyl mercaptan, benzyl mercaptan, 4-chlorobenzyl mercaptan, methyl thioglycolate, ethyl thioglycolate, n-butyl thioglycolate, n-octyl thioglycolate, methyl (3-mercaptopropionate), ethyl (3-mercaptopropionate), 3-methoxybutyl (3-methylpropionate), n-butyl (3-mercaptpropionate), 2-ethylhexyl (3-mercaptopropionate) and n-octyl (3-mercaptopropionate); and polymercaptans such as methanedithiol, 1,2-dimercaptoethane, 1,2-dimercaptopropane, 2,2-dimercaptopropane, 1,3-dimercaptopropane, 1,2,3-trimercaptopropane, 1,4-dimercaptobutane, 1,6-dimercaptohexane, bis(2-mercaptoethyl)sulfide, 1,2-bis(2-mercaptoethylthio)ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptobutane, 2-(2-mercaptoethylthio)-1,3-dimercaptopropane, 1,2-bis(2-mercaptoethylthio)-3-mercaptopropane, 1,1,1-tris(mercaptomethyl)propane, tetrakis-(mercaptomethyl)methane, ethylene glycol bis(2-mercaptoacetate), ethylene glycol bis(3-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,1-dimercaptocyclohexane, 1,4-dimercaptocyclohexane, 1,3-dimercaptocyclohexane, 1,2-dimercaptocyclohexane, 1,4-bis(mercaptomethyl)cyclohexane, 1,3-bis-(mercaptomethyl)cyclohexane, 2,5-bis(mercaptomethyl)-1,4-dithiane, 2,5-bis(2-mercaptoethyl)-1,4-dithiane, 2,5-bis(mercaptomethyl)-1-dithiane, 2,5-bis(2-mercaptoethyl)-1-thiane, 1,4-bis(mercaptomethyl)benzene, 1,3-bis(mercaptomethyl)benzene, bis(4-mercaptophenyl)sulfide, bis(4-mercaptophenyl)ether, 2,2-bis(4-mercaptophenyl)propane, bis(4-mercaptomethylphenyl)sulfide, bis(4-mercaptomethylphenyl)ether, 2,2-bis(4-mercaptomethylphenyl)propane, 2,5-dimercapto-1,3,4-thiadiazole and 3,4-thiophenedithiol.

Specific examples of the thiophenol include thiophenol, 4-tert-butylthiophenol, 2-methylthiophenol, 3-methylthiophenol, 4-methylthiophenol, 1,2-dimercaptobenzene, 1,3-dimercaptobenzene and 1,4-dimercaptobenzene.

Specific examples of the mercaptans and thiophenols having unsaturated groups are as follows.

Specific examples of the mercaptan having unsaturated groups include allyl mercaptan, 2-vinylbenzyl mercaptan, 3-vinylbenzyl mercaptan and 4-vinylbenzyl mercaptan.

Specific examples of the thiophenol having unsaturated groups include 2-vinylthiophenol, 3-vinylthiophenol and 4-vinylthiophenol. The above compounds can be used in an amount of 0.001 to 40 parts by weight per 100 parts by weight of the composition of the present invention.

When compound (a) and compound (b) as the materials and, optionally, the above antioxidants, curing catalysts and compounds having unsaturated groups and reactive with the episulfide group and/or the epoxy group such as glycidyl methacrylate and thioglycidyl methacrylate (a compound obtained by converting the epoxy group of glycidyl methacrylate into the episulfide group) are used in the curing of the composition of the present invention, radical polymerization initiators, radical polymerizable monomers and other additives such as adhesion improvers, antioxidants other than the above antioxidants and ultraviolet absorbents are mixed with the above materials and the prepared mixture is cured by polymerization to produce optical materials such as lenses. The mixture is cast into a mold made of glass or metal and cured by heating and the cured product is then taken out of the mold.

When compound (a), compound (b), the antioxidant used as an auxiliary material and the compound having two or more functional groups reactive with the episulfide group and/or the epoxy group of compound (a), the compound having one or more functional groups reactive with the episulfide group and/or the epoxy group of compound (a) and one or more homopolymerizable functional groups, the compound having one or more homopolymerizable functional groups or the compound having one homopolymerizable functional group which is reactive with the episulfide group and/or the epoxy group can react by themselves, it is possible that, before the casting into a mold, a preliminary reaction of the entire amount or a portion of the above compounds is conducted at −100 to 160° C. for 0.1 to 48 hours in the presence or the absence of a catalyst while being stirred or not stirred without other ingredients and/or in combination with reactive other materials and/or auxiliary materials to prepare an intermediate composition and then the prepared intermediate composition is cast into a mold. When the above compounds cannot react by themselves, the compounds can be treated similarly in combination with other reactive materials and/or auxiliary materials. That the compounds can react by themselves means that the materials and the auxiliary materials comprise compounds which cannot react by themselves alone or that the materials and auxiliary materials are composed of a plurality of components which cannot react by themselves and cannot react with each other.

The curing time is 0.1 to 100 hours and generally 1 to 48 hours. The curing temperature is −10 to 160° C. and generally −10 to 140° C. The polymerization can be conducted by the steps of holding the temperature at a specific polymerization temperature for a specific period of time, increasing the temperature at a speed of 0.1 to 100° C./hour and decreasing the temperature at a speed of 0.1 to 100° C./hour or a combination of these steps. To remove strains from the optical material of the present invention, it is preferable that the material obtained after the curing is annealed at a temperature of 50 to 150° C. for about 10 minutes to 5 hours. Where necessary, the prepared material may have treatments of tinting, formation of hard coat, prevention of reflection and prevention of clouding.

The process for producing the optical material of the cured resin of the present invention is described more specifically in the following. The main materials and auxiliary materials are mixed together as described above and the obtained mixture is cast into a mold and cured. Compound (a), compound (b) and components which are optionally used, i.e., the compound having two or more functional groups reactive with the episulfide group and/or the epoxy group, the compound having one or more functional groups reactive with the episulfide group and/or the epoxy group and one or more homopolymerizable functional groups, the compound having one or more homopolymerizable groups, the compound having one homopolymerizable functional group which is reactive with the episulfide group and/or the epoxy group, the antioxidants, the curing catalysts, the radical initiators, the adhesion improvers and the stabilizers, may be mixed together in one vessel at the same time in the entire amounts. Alternatively, the components may be added stepwise. Some components may also be mixed together separately in advance and the obtained mixtures may be mixed together in one vessel. The main materials and the auxiliary materials may be mixed together in any desired order. In general, the temperature of mixing and the time of mixing are not limited as long as the components can be sufficiently mixed together. However, excessively high temperature and long time are not preferable because undesirable reactions takes place between the components to increase viscosity and the operation of casting becomes difficult. The temperature of mixing should be in the range of about −20 to 100° C., preferably in the range of −10 to 50° C. and more preferably in the range of −5 to 30° C. The time of mixing is in the range of 1 minute to 5 hours, preferably in the range of 5 minutes to 2 hours, more preferably in the range of 5 to 30 minutes and most preferably about 5 to 15 minutes. It is preferable that degassing under a vacuum is conducted before, during or after mixing the materials and the additives to prevent formation of bubbles during casting and curing in the mold. The pressure of the degassing is 0.1 to 700 mmHg and preferably 10 to 300 mmHg. To obtain a better quality of the optical material of the present invention, it is preferable that impurities are removed by filtration using a microfilter or the like before the casting.

In the present invention, tinting of the cured optical material is conducted by dipping the material into a liquid composition containing 0.01 to 100 g of dyestuffs and, optionally, 0.001 to 50 g of carrier compounds in 1 liter of water and heated to 30 to 150° C.

The amount of the dyestuffs used in the liquid composition is 0.01 to 100 g, preferably 0.05 to 50 g and more preferably 0.1 to 25 g in 1 liter of water. When the amount of the dyestuffs is less than 0.01 g, the time required for tinting increases and sufficient tinting cannot be achieved. When the amount of the dyestuffs exceeds 100 g, the dyestuffs are agglomerated together and uniform dispersion of the dyestuffs becomes difficult. This adversely affects the tinting and uneven tinting occurs. As the dyestuffs, commercial dyestuffs which are conventionally used in the related fields such as disperse dyes, cation dyes, basic dyes, acidic dyes and reactive dyes can be used. However, any other dyestuffs may be used as long as the same effects can be exhibited. A plurality of dyestuffs may be used in combination in accordance with the application as long as the effects do not cancel each other.

A carrier compound is occasionally not required. When a carrier compound is necessary, the amount used is 0.001 to 50 g and preferably 0.005 to 50 g per one liter of water. When the amount of the carrier compound is less than 0.001 g, the effect of the carrier compound is not sufficiently exhibited. When the amount exceeds 50 g, uniform tinting becomes difficult. As the carrier compound, aromatic compounds are typically used. However, the carrier compound is not particularly limited as long as the effect similar to that of the aromatic compounds is exhibited. Examples of the carrier compound include phenol, phenylphenol, benzyl alcohol, phenetyl alcohol, xylylenediol, benzoic acid, esters of benzoic acid, salicylic acid, esters of salicylic acid, phthalic acid, mono- and diesters of phthalic acid, isophthalic acid, mono- and diesters of isophthalic acid, terephthalic acid, mono- and diesters of terephthalic acid, alkylbenzenes, styrene, diphenyl, chlorobenzene, naphthalene, α-vinylnaphthalene and β-vinylnaphthalene.

The material is dipped into the liquid composition at a temperature of 30 to 150° C. and preferably 50 to 120° C. When the temperature is lower than 30° C., the time required for tinting increases. When the temperature is higher than 150° C., a high pressure is required and the material is deformed by heat.

Other conditions of the dipping are not particularly limited. The dipping can be conducted at the above temperature for a time of several seconds to several hours. pH is not particularly limited as long as the dyestuffs, the carrier compounds and surfactants used remain stable.

To the liquid composition used in the present invention, additives such as organic solvents, surfactants, pH modifiers, dispersion promoters, defoaming agents, moisturizing agents and boiling point increasing agents may be added where necessary.

To summarize the advantages obtained by the invention, it is enabled by the resin optical material obtained by curing the composition of the present invention that the resin optical material having a sufficiently high refractive index and an excellent balance between the refractive index and the Abbe number has also an excellent tint performance without adverse effect on heat resistance. It is difficult that materials from conventional compounds have such excellent properties.

EXAMPLES

The present invention is described more specifically with reference to the following examples. However, the present invention is not limited to the examples. The obtained polymers were evaluated in accordance with the following methods.

Tint performance: A sample was dipped into a tinting bath having the following composition at a temperature of 90° C. for 30 minutes:

| SEIKO PRAX DIACOAT BROWN D | 0.2% by weight |
|---|---|
| SEIKO PRAX tinting auxiliary agent | 0.3% by weight |
| benzyl alcohol | 2.0% by weight |

The tint performance was obtained in accordance with the following equation:

Tint performance=100−total light transmittance (%)

Oxidation resistance: The oxidation resistance was evaluated from the change in b before and after the heat treatment in the air at 120° C. for 3 hours:

Change in $b=b$ after heat treatment$-b$ before heat treatment

Heat resistance: The heat resistance was evaluated by modulus at 90° C. in the measurement of dynamic viscoelasticity of bending. The measurement was conducted at the frequency of 10 Hz while the temperature increased from 30° C. to 130° C. at the speed of increase of 2° C./minute.

Refractivity index (nD) and Abbe number (vD): The refractivity index and the Abbe number were measured at 25° C. using an Abbe refractometer.

Example 1

To 100 parts by weight of a mixture comprising 50 parts by weight of bis(β-epithiopropyl)sulfide as compound (a), 44 parts by weight of 3-phenoxy-2-hydroxypropyl acrylate as compound (b) and 6 parts by weight of n-butyl thioglycolate as the antioxidant component, 0.5 parts by weight of 2-diethylaminoethanol as the catalyst was mixed and the obtained mixture was stirred at a room temperature to obtain a homogeneous solution. The ratio by mol of the active hydrogen other than the active hydrogen of SH group in compound (b) to the total of the episulfide group in compound (a) was 0.353. The obtained composition was cast into a mold for a lens and cured by polymerization under heating while the temperature was raised from 10° C. to 120° C. during 22 hours in an oven to prepare a lens. The prepared lens showed excellent tint performance, heat resistance and oxidation resistance. The lens not only had excellent optical properties and physical properties but also showed an excellent surface condition with little striae or surface deformation. The properties of the prepared lens are shown in Table 1.

Examples 2 to 18

The same procedures as those conducted in Example 1 were conducted except that the formulation was changed as shown in Table 1 and 0.5 parts by weight of 2-diethylaminoethanol per 100 parts by weight of the composition was used as the catalyst. The results are shown in Table 1.

In all cases, the prepared lens showed excellent tint performance, heat resistance and oxidation resistance. The lens not only had excellent optical properties and physical properties but also showed an excellent surface condition with little striae or surface deformation. The properties of the prepared lens are shown in Table 1.

Example 19

To 100 parts by weight of a mixture comprising 93 parts by weight of bis(β-epithiopropyl)sulfide as compound (a), 1 part by weight of 2-hydroxyethyl methacrylate as compound (b) and the remaining amount of n-butyl thioglycolate as the antioxidant component, 0.5 parts by weight of 2-diethylaminoethanol as the catalyst, 0.2 parts by weight of 2,6-di-tert-butyl-4-methylphenol as the antioxidant and 0.1 part by weight of 2-(2-hydroxy-5-tert-octylphenyl)benzotriazole as the ultraviolet light absorbent were mixed and the obtained mixture was stirred at a room temperature to obtain a homogeneous solution. Then, the solution was sufficiently degassed at the reduced pressure of 10 mmHg. The ratio by mol of the active hydrogen other than the active hydrogen of SH group in compound (b) to the total of the episulfide group in compound (a) was 0.007. The obtained composition was cast into a mold for a lens and cured by polymerization under heating while the temperature was raised from 10° C. to 120° C. during 22 hours in an oven to prepare a lens. The prepared lens showed excellent tint performance, heat resistance and oxidation resistance. The lens not only had excellent optical properties and physical properties but also showed an excellent surface condition with little striae or surface deformation. The properties of the prepared lens are shown in Table 1.

Example 20

To 100 parts by weight of a mixture comprising 93 parts by weight of bis(β-epithiopropyl)sulfide as compound (a), 1 part by weight of 2-hydroxyethyl methacrylate as compound (b) and the remaining amount of n-butyl thioglycolate as the antioxidant component, 0.05 parts by weight of 3-mercaptopropyltrimethoxysilane as the adhesion improver and 0.5 parts by weight of 2-diethylaminoethanol as the catalyst were mixed and the obtained mixture was stirred at a room temperature to obtain a homogeneous solution. Then, the solution was sufficiently degassed at the reduced pressure of 10 mmHg. The ratio by mol of the active hydrogen other than the active hydrogen of SH group in compound (b) to the total of the episulfide group in compound (a) was 0.007. The obtained composition was cast into a mold for a lens and cured by polymerization under heating while the temperature was raised from 10° C. to 120° C. during 22 hours in an oven to prepare a lens. The prepared lens showed excellent tint performance, heat resistance and oxidation resistance. The lens not only had excellent optical properties and physical properties but also showed a more excellent surface condition than that obtained without using the adhesion improver. Little striae or surface deformation was formed. The properties of the prepared lens are shown in Table 1.

TABLE 1

| | formulation (parts by weight) | | | | | |
|---|---|---|---|---|---|---|
| | compound (a) | | compound (b) | | other component | |
| Example 1 | bis(β-epithiopropyl)sulfide | (50) | 3-phenoxy-2-hydroxypropyl acrylate | (44) | n-butyl thioglycolate | (6) |
| Example 2 | bis(β-epithiopropyl)sulfide | (60) | 2-hydroxyethyl methacrylate | (34) | n-butyl thioglycolate | (6) |
| Example 3 | bis(β-epithiopropyl)sulfide | (59) | 3-phenoxy-2-hydroxypropyl acrylate | (35) | n-butyl thioglycolate | (6) |
| Example 4 | bis(β-epithiopropyl)sulfide | (70) | 2-hydroxyethyl methacrylate | (24) | n-butyl thioglycolate | (6) |
| Example 5 | bis(β-epithiopropyl)sulfide | (77) | 2-mercaptoethanol | (17) | n-butyl thioglycolate | (6) |
| Example 6 | bis(β-epithiopropyl)sulfide | (69) | 3-phenoxy-2-hydroxypropyl acrylate | (25) | n-butyl thioglycolate | (6) |
| Example 7 | bis(β-epithiopropyl)sulfide | (79) | 2-hydroxyethyl methacrylate | (15) | n-butyl thioglycolate | (6) |

TABLE 1-continued

| | | | | | | | |
|---|---|---|---|---|---|---|---|
| Example 8 | bis(β-epithiopropyl) sulfide | (84) | 2-mercaptoethanol | (10) | n-butyl thio-glycolate | (6) |
| Example 9 | bis(β-epithiopropyl) sulfide | (93) | 3-phenoxy-2-hydroxy-propyl acrylate | (1) | n-butyl thio-glycolate | (6) |
| Example 10 | bis(β-epithiopropyl) sulfide | (93) | 2-hydroxyethyl methacrylate | (1) | n-butyl thio-glycolate | (6) |
| Example 11 | bis(β-epithiopropyl) sulfide | (94) | 2-mercaptoethanol | (3) | n-butyl thio-glycolate | (3) |
| Example 12 | bis(β-epithiopropyl) sulfide | (90) | 3-phenoxy-2-hydroxy-propyl acrylate | (5) | bis(2-mercapto-ethyl) sulfide | (5) |
| Example 13 | bis(β-epithiopropyl) sulfide | (94) | 2-hydroxyethyl methacrylate 2-mercaptoethanol | (1) (3) | n-butyl thio-glycolate | (2) |
| Example 14 | bis(β-epithiopropyl) sulfide | (94) | 2-hydroxyethyl methacrylate | (1) | 2,5-dimercapto-methyl-1,4-dithiane | (5) |
| Example 15 | bis(β-epithiopropyl) sulfide | (94) | 2-hydroxyethyl methacrylate | (1) | 2-(2-mercapto-ethl)thio-1,3-di-mercaptopropane | (5) |
| Example 16 | bis(β-epithiopropyl) sulfide | (94) | 2-hydroxyethyl methacrylate | (1) | 1,2-bis(2-mercap-toethylthio)-3-mercaptopropane | (5) |
| Example 17 | 1,2-bis(β-epithio-propylthio)ethane | (93) | 2-hydroxyethyl methacrylate | (1) | n-butyl thio-glycolate | (2) |
| Example 18 | bis[2-(β-epithio-propylthio)ethyl] sulfide | (93) | 2-hydroxyethyl methacrylate | (1) | n-butyl thio-glycolate | (6) |
| Example 19[2)] | bis(β-epithiopropyl) sulfide | (93) | 2-hydroxyethyl methacrylate | (1) | n-butyl thio-glycolate | (6) |
| Example 20[3)] | bis(β-epithiopropyl) sulfide | (93) | 2-hydroxyethyl methacrylate | (1) | n-butyl thio-glycolate | (6) |

| | active hydrogen/episulfide group[1)] | tint performance | oxidation resistance | heat resistance (MPa) | nD | vD |
|---|---|---|---|---|---|---|
| Example 1 | 0.353 | 76 | 0.18 | 380 | 1.622 | 37 |
| Example 2 | 0.388 | 78 | 0.17 | 360 | 1.625 | 40 |
| Example 3 | 0.238 | 60 | 0.14 | 450 | 1.637 | 37 |
| Example 4 | 0.235 | 62 | 0.14 | 430 | 1.646 | 39 |
| Example 5 | 0.252 | 64 | 0.13 | 410 | 1.687 | 37 |
| Example 6 | 0.145 | 56 | 0.12 | 560 | 1.654 | 37 |
| Example 7 | 0.130 | 56 | 0.11 | 520 | 1.664 | 38 |
| Example 8 | 0.136 | 58 | 0.09 | 500 | 1.691 | 37 |
| Example 9 | 0.004 | 41 | 0.06 | 700 | 1.695 | 36 |
| Example 10 | 0.007 | 41 | 0.06 | 630 | 1.693 | 37 |
| Example 11 | 0.037 | 45 | 0.03 | 600 | 1.698 | 36 |
| Example 12 | 0.022 | 40 | 0.05 | 600 | 1.699 | 36 |
| Example 13 | 0.044 | 48 | 0.05 | 620 | 1.700 | 37 |
| Example 14 | 0.007 | 40 | 0.06 | 670 | 1.706 | 37 |
| Example 15 | 0.007 | 41 | 0.04 | 660 | 1.706 | 37 |
| Example 16 | 0.007 | 40 | 0.05 | 640 | 1.706 | 37 |
| Example 17 | 0.010 | 45 | 0.04 | 610 | 1.688 | 37 |
| Example 18 | 0.012 | 48 | 0.04 | 600 | 1.677 | 37 |
| Example 19 | 0.007 | 45 | 0.02 | 690 | 1.693 | 37 |
| Example 20 | 0.007 | 42 | 0.06 | 700 | 1.693 | 37 |

[1)]Ratio by mol of active hydrogen other than the active hydrogen of SH group in compound (b) to the episulfide group in compound (a).
[2)]Per 100 parts by weight of the composition, 0.5 parts by weight of 2,6-di-tert-butyl-4-methylphenol as the antioxidant and 0.1 part by weight of 2-(2-hydroxy-5-tert-octylphenyl)benzotriazole as the ultraviolet light absorbent were added.
[3)]Per 100 parts by weight of the composition, 0.5 parts by weight of 3-glycidoxytrimethoxysilane was added as the adhesion improver.

TABLE 1-2

| | active hydrogen/episulfide group[1)] | tint performance | oxidation resistance | heat resistance (MPa) | nD | vD |
|---|---|---|---|---|---|---|
| Example 1 | 0.353 | 76 | 0.18 | 380 | 1.622 | 37 |
| Example 2 | 0.388 | 78 | 0.17 | 360 | 1.625 | 40 |
| Example 3 | 0.238 | 60 | 0.14 | 450 | 1.637 | 37 |
| Example 4 | 0.235 | 62 | 0.14 | 430 | 1.646 | 39 |
| Example 5 | 0.252 | 64 | 0.13 | 410 | 1.687 | 37 |
| Example 6 | 0.145 | 56 | 0.12 | 560 | 1.654 | 37 |
| Example 7 | 0.130 | 56 | 0.11 | 520 | 1.664 | 38 |
| Example 8 | 0.136 | 58 | 0.09 | 500 | 1.691 | 37 |

TABLE 1-2-continued

|  | active hydrogen/ episulfide group[1] | tint performance | oxidation resistance | heat resistance (MPa) | nD | vD |
|---|---|---|---|---|---|---|
| Example 9 | 0.004 | 41 | 0.06 | 700 | 1.695 | 36 |
| Example 10 | 0.007 | 41 | 0.06 | 630 | 1.693 | 37 |
| Example 11 | 0.037 | 45 | 0.03 | 600 | 1.698 | 36 |
| Example 12 | 0.022 | 40 | 0.05 | 600 | 1.699 | 36 |
| Example 13 | 0.044 | 48 | 0.05 | 620 | 1.700 | 37 |
| Example 14 | 0.007 | 40 | 0.06 | 670 | 1.706 | 37 |
| Example 15 | 0.007 | 41 | 0.04 | 660 | 1.706 | 37 |
| Example 16 | 0.007 | 40 | 0.05 | 640 | 1.706 | 37 |
| Example 17 | 0.010 | 45 | 0.04 | 610 | 1.688 | 37 |
| Example 18 | 0.012 | 48 | 0.04 | 600 | 1.677 | 37 |
| Example 19 | 0.007 | 45 | 0.02 | 690 | 1.693 | 37 |
| Example 20 | 0.007 | 42 | 0.06 | 700 | 1.693 | 37 |

[1] Ratio by mol of active hydrogen other than the active hydrogen of SH group in compound (b) to the episulfide group in compound (a).
[2] Per 100 parts by weight of the composition, 0.5 parts by weight of 2,6-di-tert-butyl-4-methylphenol as the antioxidant and 0.1 part by weight of 2-(2-hydroxy-5-tert-octylphenyl)benzotriazole as the ultraviolet light absorbent were added.
[3] Per 100 parts by weight of the composition, 0.5 parts by weight of 3-glycidoxytrimethoxysilane was added as the adhesion improver.

Comparative Example 1

The same procedures as those conducted in Example 1 were conducted using 100 parts by weight of bis(β-epithiopropyl)sulfide as compound (a), no compound (b) and 0.5 parts by weight of 2-diethylaminoethanol as the catalyst. The results are shown in Table 2. The tint performance was not satisfactory because compound (b) was not used.

Comparative Example 2

The same procedures as those conducted in Example 1 were conducted using 100 parts by weight of a mixture comprising 94 parts by weight of bis(β-epithiopropyl)sulfide as compound (a), no compound (b) and 6 parts by weight of n-butyl thioglycolate as the antioxidant component and 0.5 parts by weight of 2-diethylaminoethanol as the catalyst. The results are shown in Table 2. The tint performance was not satisfactory because compound (b) was not used.

Comparative Examples 3 to 11

The same procedures as those conducted in Example 1 were conducted using 100 parts of a mixture of the formulation shown in Table 2 and 0.5 parts by weight of 2-diethylaminoethanol as the catalyst. The results are shown in Table 2. In all cases, the heat resistance was inferior because the ratio by mol of the active hydrogen other than the active hydrogen of SH group in compound (b) to the total of the episulfide group in compound (a) was outside the range specified in the present invention.

Comparative Example 12

The same procedures as those conducted in Example 1 were conducted using 100 parts of a mixture of the formulation shown in Table 2 and 0.5 parts by weight of 2-diethylaminoethanol as the catalyst. The results are shown in Table 2. The tint performance was not satisfactory because the episulfide compound which is not specified in the present invention was used as compound (a).

TABLE 2

| | formulation (parts by weight) | | | | | |
|---|---|---|---|---|---|---|
| | compound (a) | | compound (b) | | other component | |
| Comparative Example 1 | bis(β-epithiopropyl)sulfide | (100) | none | | none | |
| Comparative Example 2 | bis(β-epithiopropyl)sulfide | (94) | none | | n-butyl thioglycolate | (6) |
| Comparative Example 3 | bis(β-epithiopropyl)sulfide | (40) | 3-phenoxy-2-hydroxy-propyl acrylate | (54) | n-butyl thioglycolate | (6) |
| Comparative Example 4 | bis(β-epithiopropyl)sulfide | (50) | 2-hydroxyethyl methacrylate | (44) | n-butyl thioglycolate | (6) |
| Comparative Example 5 | bis(β-epithiopropyl)sulfide | (62) | 2-mercaptoethanol | (32) | n-butyl thioglycolate | (6) |
| Comparative Example 6 | bis(β-epithiopropyl)sulfide | (51) | 2-hydroxyethyl methacrylate | (44) | 2,5-dimercapto-methyl-1,4-dithiane | (5) |
| Comparative Example 7 | bis(β-epithiopropyl)sulfide | (51) | 2-hydroxyethyl methacrylate | (44) | 2-(2-mercaptoethylthio)-1,3-dimercapto-propane | (5) |
| Comparative Example 8 | bis(β-epithiopropyl)sulfide | (51) | 2-hydroxyethyl methacrylate | (44) | n-butyl thioglycolate | (6) |
| Comparative Example 9 | bis(β-epithiopropyl)sulfide | (62) | 2-hydroxyethyl methacrylate 2-mercaptoethanol | (9) (27) | n-butyl thioglycolate | (2) |
| Comparative Example 10 | bis(β-epithiopropyl)sulfide | (59) | 2-hydroxyethyl methacrylate | (35) | n-butyl thioglycolate | (6) |
| Comparative Example 11 | bis(β-epithiopropyl)sulfide | (63) | 2-hydroxyethyl methacrylate | (31) | n-butyl thioglycolate | (6) |
| Comparative Example 12 | bis(β-epithiopropyl)sulfide | (93) | 2-hydroxyethyl methacrylate | (1) | n-butyl thioglycolate | (6) |

TABLE 2-continued

| | active hydrogen/ episulfide group[1] | tint performance | oxidation resistance | heat resistance (MPa) | nD | vD |
|---|---|---|---|---|---|---|
| Comparative Example 1 | 0.000 | 15 | 0.56 | 1300 | 1.708 | 36 |
| Comparative Example 2 | 0.000 | 17 | 0.28 | 1100 | 1.698 | 37 |
| Comparative Example 3 | 0.542 | 77 | 0.23 | 120 | 1.605 | 37 |
| Comparative Example 4 | 0.603 | 79 | 0.24 | 110 | 1.604 | 41 |
| Comparative Example 5 | 0.588 | | not polymerized | | | |
| Comparative Example 6 | 0.591 | 79 | 0.22 | 130 | 1.616 | 40 |
| Comparative Example 7 | 0.591 | 78 | 0.25 | 100 | 1.616 | 40 |
| Comparative Example 8 | 0.591 | 80 | 0.21 | 130 | 1.616 | 40 |
| Comparative Example 9 | 0.596 | | not polymerized | | | |
| Comparative Example 10 | 0.544 | 78 | 0.21 | 120 | 1.619 | 40 |
| Comparative Example 11 | 0.565 | 79 | 0.22 | 110 | 1.620 | 40 |
| Comparative Example 12 | 0.154 | 19 | 0.83 | 450 | 1.612 | 31 |

[1] Ratio by mol of active hydrogen other than the active hydrogen of SH group in compound (b) to the episulfide group in compound (a).

TABLE 2-2

| | active hydrogen/ episulfide group[1] | tint performance | oxidation resistance | heat resistance (MPa) | nD | vD |
|---|---|---|---|---|---|---|
| Comparative Example 1 | 0.000 | 15 | 0.56 | 1300 | 1.708 | 36 |
| Comparative Example 2 | 0.000 | 17 | 0.28 | 1100 | 1.698 | 37 |
| Comparative Example 3 | 0.542 | 77 | 0.23 | 120 | 1.605 | 37 |
| Comparative Example 4 | 0.603 | 79 | 0.24 | 110 | 1.604 | 41 |
| Comparative Example 5 | 0.588 | | not polymerized | | | |
| Comparative Example 6 | 0.591 | 79 | 0.22 | 130 | 1.616 | 40 |
| Comparative Example 7 | 0.591 | 78 | 0.25 | 100 | 1.616 | 40 |
| Comparative Example 8 | 0.591 | 80 | 0.21 | 130 | 1.616 | 40 |
| Comparative Example 9 | 0.596 | | not polymerized | | | |
| Comparative Example 10 | 0.544 | 78 | 0.21 | 120 | 1.619 | 40 |
| Comparative Example 11 | 0.565 | 79 | 0.22 | 110 | 1.620 | 40 |
| Comparative Example 12 | 0.154 | 19 | 0.83 | 450 | 1.612 | 31 |

[1] Ratio by mol of active hydrogen other than the active hydrogen of SH group in compound (b) to the episulfide group in compound (a).

What is claimed is:

1. A composition for a resin which comprises:

a compound (a) having one or more structures represented by the following formula (1) in one molecule:

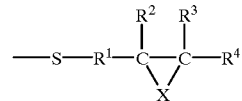

(1)

wherein $R^1$ represents a hydrocarbon group having 1 to 10 carbon atoms, $R^2$, $R^3$ and $R^4$ each represents a hydrogen atom or a hydrocarbon group having 1 to 10 carbon atoms, X represents S or O, and an average number of S represented by X is about 50% or more of a total number of S and O constituting the three-membered ring containing X, and a compound (b) selected from the group consisting of an alcohol having an acryloyloxy group or a methacryloyloxy group, said compound (b) having one or more active hydrogen atoms in one molecule, at least one of the active hydrogen atoms being an active hydrogen atom other than the hydrogen atom of a SH group, wherein a mole ratio of a total of the active hydrogen atoms other than the hydrogen atom of the SH group in the compound (b) to a total of an episulfide group and an epoxy group in the compound (a) is 0.001 to 0.5.

2. A composition according to claim 1, wherein the compound (a) is a compound represented by the following formula (2):

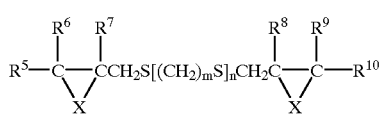

(2)

wherein $R^5$ to $R^{10}$ each represents a hydrogen atom or a hydrocarbon group having 1 to 10 carbon atoms, X represents S or O and an average number of S represented by X is about 50% or more of a total number of S and O constituting the three-member rings, m represents 1 to 6 and n represents 0 to 4.

3. A resin obtained by curing the composition described in claim 1 by polymerization.

4. An optical material obtained by curing the resin composition described in claim 1 by polymerization.

5. A process for obtaining a resin comprising curing the composition described in claim 1 by polymerization.

6. A process for obtaining an optical material comprising curing the composition described in claim 1 by polymerization.

7. A composition according to claim 1, wherein the mole ratio of a total of the active hydrogen atoms other than the hydrogen atom of the SH group in compound (b) to a total of an episulfide group and an epoxy group in compound (a) is 0.001 to 0.3.

8. A composition according to claim 7, wherein the mole ratio is 0.001 to 0.2.

9. A composition according to claim 7, wherein the mole ratio is 0.01 or more and less than 0.1.

10. A composition according to claim 9, wherein the average number of S is 90% or more of the total of S and O constituting the three-membered ring.

11. A composition according to claim 9, wherein the average number of S is 95% or more of the total of S and O constituting the three-membered ring.

12. A composition according to claim 11, wherein the compound (a) is selected from the group consisting of bis(β-epothiopropyl)sulfide, bis(β-epithiopropylthio) methane, 1,2-bis(β-epithiopropylthio)ethane, 1,3-bis(β-epithiopropylthio)propane, 1,2-bis(β-epithiopropylthio) propane, 1-(β-epithiopropylthio)-2-(β-epithiopropylthiomethyl)propane, 1,4-bis(β-epithiopropylthio)butane, 1,3-bis(β-epithiopropylthio) butane, 1-(β-epithiopropylthio)-3-(β-epithiopropylthiomethyl)-butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(5-epithiopropylthio)-5-(β-epithiopropylthiomethyl)hexane, 1-(β-epithiopropylthio)-2-[(2-β-epithiopropylthioethyl)thio]ethane and 1-(β-epithiopropylthio)-2-[[2-(2-β-epithiopropylthioethyl)thioethyl]thio]ethane, tetrakis(β-epithiopropylthiomethyl) methane, 1,1,1-tris(β-epithiopropylthiomethyl)propane,-1, 5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epthiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl) thiomethyl]-3,7-dithianonane, 1,10-bis(β-epithiopropylthio)-5,6-bis [(2-β-epithiopropylthioethyl) thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl) thiomethyl]-3,6,9-trithiaundecane, 1,11-bis(β-epithiopropylthio)-4,7-bis(β-epithiopropylthiomethyl)-3,6,9-trithiaudecane, 1,3-bis(β-epithiopropylthio)cyclohexane, 1,4-bis(β-epithiopropylthio)cyclohexane, 1,3-bis(β-epithiopropylthiomethyl) cyclohexane, 1,4-bis(β-epithiopropylthiomethyl)cyclohexane, bis[4-bis-(β-epithiopropylthio)cyclohexyl]methane, 2,2-bis[4-(β-epithiopropylthio)cyclohexyl]propane, bis[4-(β-epithiopropylthio)cyclohexyl]sulfide, 2,5-bis(β-epithiopropylthiomethyl)-1,4-dithiane 2,5-bis(β-epithiopropylthioethylthiomethyl)-1,4-dithiane, 1,3-bis(β-epithiopropylthio)benzene, 1,4-bis(β-epithiopropylthio) benzene, 1,3-bis(β-epithiopropylthiomethyl) benzene, 1,4-bis(β-epithiopropylthiomethyl)benzene, bis[4-(β-epithiopropythiophenyl]methane, 2,2-bis[4-(βepithiopropylthio)phenyl]propane. bis[4-(β-epithiopropylthio)phenyl]sulfide, bis[4-(β-epithiopropylthio)phenyl]sulfone and 4,4'-bis(β-epithiopropylthio)biphenyl; and the compound (b) is selected from the group 1,3-dimethacryloxy-2-propanol, 1,3-diacryloxy-2-propanol and 1-acryloxy-3-methacryloxy-2-propanol.

13. A composition according to claim 9, wherein the average number of S is substantially 100% of the total of S and O constituting the three-membered ring.

14. A composition for a resin which comprises:
a compound (a) having one or more structures represented by the following formula (1) in one molecule:

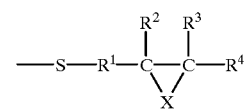

(1)

wherein $R^1$ represents a hydrocarbon group having 1 to 10 carbon atoms, $R^2$, $R^3$ and $R^4$ each represents a hydrogen atom or a hydrocarbon group having 1 to 10 carbon atoms, X represents S or O, and an average number of S represented by X is about 50% or more of a total number of S and O constituting the three-membered ring containing X, and a compound (b), the compound (b) being a mercaptoalcohol having one or more active hydrogen atoms in one molecule, at least one of the active hydrogen atoms being an active hydrogen atom other than the hydrogen atom of a SH group, wherein a mole ratio of a total of the active hydrogen atoms other than the hydrogen atom of the SH group in the compound (b) to a total of an episulfide group and an epoxy group in the compound (a) is 0.001 to 0.5.

15. A composition according to claim 14, wherein the compound (a) is a compound represented by the following formula (2):

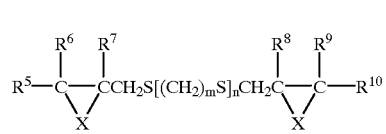

(2)

wherein $R^5$, $R^6$, $R^7$, $R^8$, $R^9$ and $R^{10}$ each represents a hydrogen atom or a hydrocarbon group having 1 to 10 carbon atoms, X represents S or O, and an average number of S represented by X is about 50% or more of a total number of S and O constituting the three-member rings, m represent 1 to 6 and n represents 0 to 4.

16. A resin obtained by curing the composition described in claim 14 by polymerization.

17. An optical material obtained by curing the resin composition described in claim 14 by polymerization.

18. A process for obtaining a resin comprising curing the composition described in claim 14 by polymerization.

19. A process for obtaining an optical material comprising curing the composition described in claim 14 by polymerization.

20. A composition according to claim 14, wherein compound (b) is selected from the group consisting of 2-mercaptoethanol, 3-mercaptopropanol, 2-mercaptopropanol, 2-hydroxypropylmercaptan, 2-phenyl-2-mercaptoethanol, 2-phenyl-2-hydroxyethylmercaptan, 3-mercapto-1,2-propanediol, 2-mercapto-1,3-propanediol, 2,3-dimercapto-propanol, 1,3-dimercapto-2-propanol, 2,2-dimethylpropane-1,3-dithiol and glyceryl dithioglycolate.

* * * * *